United States Patent
Eagle et al.

(10) Patent No.: US 9,822,811 B1
(45) Date of Patent: Nov. 21, 2017

(54) CAPTIVE EXTERNALLY THREADED FASTENER METHOD

(71) Applicant: International Business Machines Corporation, Armonk, NY (US)

(72) Inventors: Jason R. Eagle, Kasson, MN (US); Scott R. LaPree, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/271,526

(22) Filed: Sep. 21, 2016

(51) Int. Cl.
*F16B 41/00* (2006.01)
*F16B 33/02* (2006.01)

(52) U.S. Cl.
CPC .......... *F16B 41/002* (2013.01); *F16B 33/02* (2013.01); *Y10T 29/49963* (2015.01)

(58) Field of Classification Search
CPC .................. Y10T 29/49963; F16B 41/002
USPC .......................................... 411/999
See application file for complete search history.

(56) References Cited

U.S. PATENT DOCUMENTS

| | | | |
|---|---|---|---|
| 2,470,927 A | 5/1949 | Hale, Jr. | |
| 3,218,906 A | 11/1965 | Dupree | |
| 4,875,818 A | 10/1989 | Reinwall | |
| 4,952,107 A | 8/1990 | Dupree | |
| 5,865,583 A | 2/1999 | Krawczak et al. | |
| 5,906,463 A | 5/1999 | Damm et al. | |
| 7,771,149 B2 | 8/2010 | Bauer et al. | |
| 8,246,281 B2* | 8/2012 | Gulistan | F16B 5/0208 411/353 |
| 8,292,562 B2* | 10/2012 | Chiu | F16B 35/041 411/107 |
| 2010/0068004 A1 | 3/2010 | Mair | |

FOREIGN PATENT DOCUMENTS

| | | |
|---|---|---|
| CN | 201428709 Y | 3/2010 |
| CN | 202585872 U | 12/2012 |

* cited by examiner

*Primary Examiner* — Jermie Cozart
(74) *Attorney, Agent, or Firm* — Matthew C. Zehrer

(57) ABSTRACT

An externally threaded fastener is captivated by a component that includes an opening. The externally threaded fastener includes a thread and a non-threaded shaft. The opening includes a major diameter and a minor diameter. The minor diameter includes a first diameter portion, a second diameter portion, and orthogonal portions that connect the first diameter portion and the second diameter portion. To captivate the externally threaded fastener with the component, the externally threaded fastener is positioned within the component opening and the externally threaded fastener is angled relative to an axis of symmetry of the opening in order to engage the threads of the externally threaded fastener with the component opening until the non-threaded shaft is fixed against at least two planes of the component by the first diameter portion of the minor diameter.

14 Claims, 8 Drawing Sheets

CAPTIVE EXTERNALLY THREADED FASTENER METHOD

FIELD OF THE INVENTION

Embodiments of the invention generally relate to threaded fasteners and more particularly to retaining a threaded fastener.

DESCRIPTION OF THE RELATED ART

A threaded fastener has internal or external screw threads. A threaded screw or bolt has external screw threads while a nut has internal screw threads. Threaded fasteners may be used for the assembly of multiple parts and facilitate disassembly. For example a bolt and nut may fasten two components together.

In some instances, it may be beneficial to integrate an externally threaded fastener to only one component without utilizing a corresponding internally threaded fastener such that the component captivates the externally threaded fastener.

The captivated externally threaded fastener is thereby held, or captivated, within the component such that there is an adequate joining therebetween that limits or prevents unintentional separation. The captivation of such a fastener may limit costs associated with a non-captivated fastener, such as damage cause by, or misplacement of, the loose fastener.

SUMMARY

In an embodiment of the present invention, a method of capturing an externally threaded fastener to a component includes angling the externally threaded fastener within an opening of the component relative to an axis of symmetry of the opening, rotating the externally threaded fastener at the angle to engage threads of the externally threaded fastener with the opening for an entire length of the threads, subsequent to engaging the threads of the externally threaded fastener with the opening for the entire length of the threads, aligning the externally threaded fastener with the axis of symmetry of the opening, and limiting movement of the externally threaded fastener in two orthogonal directions by the opening contacting a non-threaded shaft of the externally threaded fastener.

In another embodiment of the present invention, a method of capturing an externally threaded fastener to an electronic system enclosure cover includes angling the externally threaded fastener within an opening of the cover relative to an axis of symmetry of the opening, rotating the externally threaded fastener at the angle to engage threads of the externally threaded fastener with the opening for an entire length of the threads, subsequent to engaging the threads of the externally threaded fastener with the opening for the entire length of the threads, aligning the externally threaded fastener with the axis of symmetry of the opening, and limiting movement of the externally threaded fastener in two orthogonal directions by the opening contacting a non-threaded shaft of the externally threaded fastener.

In yet another embodiment of the present invention, a system for captivating an externally threaded fastener includes a component and an externally threaded fastener. The component includes a bottom surface, a top surface, and an opening extending from the top surface to the bottom surface. The opening includes a major diameter upon the top surface, a minor diameter upon the bottom surface, and a chamfer surface connecting the major diameter and the minor diameter. The chamfer surface is acutely angled from the bottom surface. The minor diameter includes a first diameter portion, a second diameter portion which has a smaller diameter than the first diameter portion, a first line portion that connects a first end point of the first diameter portion and a first endpoint of the second diameter portion, and a second line portion that connects a second end point of the first diameter portion and a second endpoint of the second diameter portion. The externally threaded fastener includes a thread, a non-threaded shaft, and a flange captivated within the opening of the component. Movement of the externally threaded fastener is limited in two orthogonal directions by the non-threaded shaft contacting the first diameter portion of the opening and movement of the externally threaded fastener is limited in a third orthogonal direction by the threads contacting the bottom surface and the flange contacting the top surface.

These and other embodiments, features, aspects, and advantages will become better understood with reference to the following description, appended claims, and accompanying drawings.

DETAILED DESCRIPTION

Embodiments of the invention relate to captivating an externally threaded fastener with a component that includes an opening. The externally threaded fastener includes a thread and a non-threaded shaft. The opening includes a major diameter and a minor diameter. The minor diameter includes a first diameter portion, a second diameter portion, and orthogonal portions that connect the first diameter portion and the second diameter portion. To captivate the externally threaded fastener with the component, the externally threaded fastener is positioned within the component opening and the externally threaded fastener is angled relative to an axis of symmetry of the opening in order to engage the threads of the externally threaded fastener with the component opening until the non-threaded shaft is fixed against two planes of the component by the first diameter portion of the minor diameter.

Figure 1:
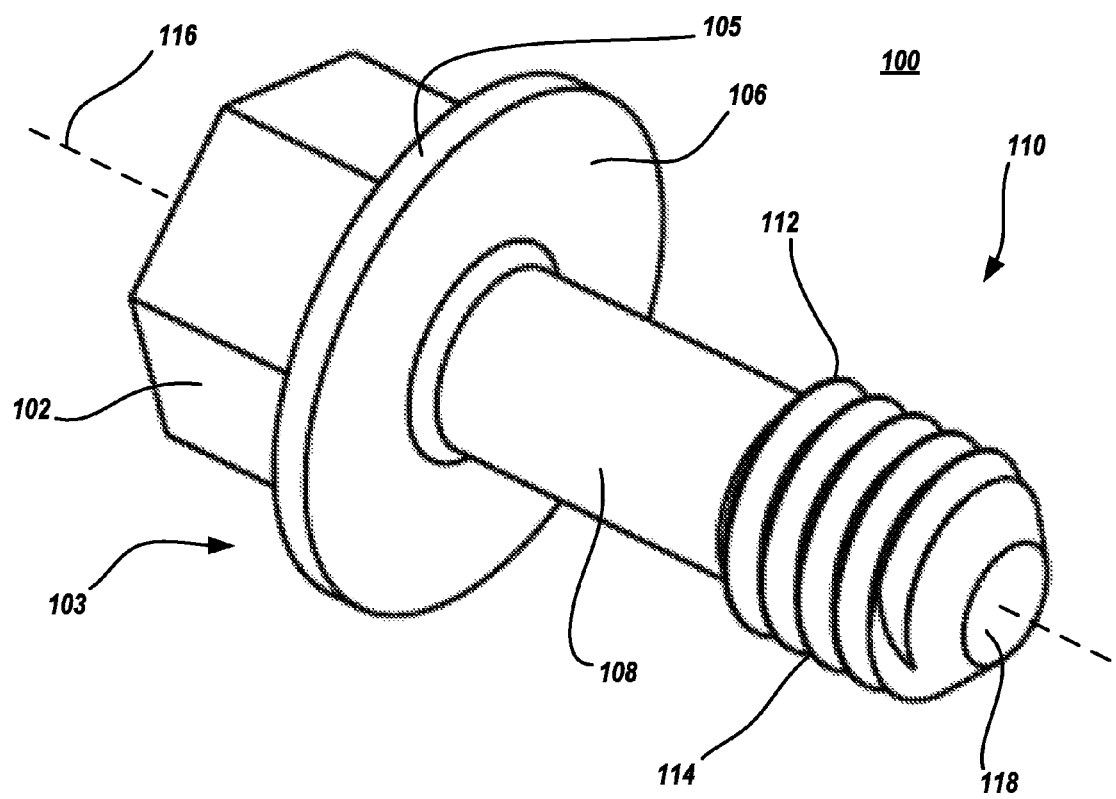
FIG. 1 illustrates an exemplary externally threaded fastener, according to one or more embodiments of the present invention.

Referring to the Drawings, wherein like numbers denote like parts throughout the several views, FIG. 1 illustrates an externally threaded fastener 100, according to one or more embodiments of the present invention. Fastener 100 includes at least threads 110 and non-threaded shaft 108 connected thereto. Fastener 100 may also include a flange 104 and head 102. In such embodiments, the non-threaded shaft 108 is connected to surface 106 of the flange 104 at the distal end of the non-threaded shaft 108, relative to the threads 110 and the head 102 is connected to the distal surface 103 of flange 104, relative to surface 106. A surface 105 of flange 104 connects surface 106 and surface 103. Head 102 may be a feature in which fastener 100 is confirmed to accept externally applied rotational force.

Axis 116 is generally the center of symmetry of head 102, flange 104, and non-threaded shaft 108 of fastener 100. Center of symmetry is defined such that a center point formed by the intersection of a plane orthogonal to a referred axis and which is related to the shape of a referred feature upon the same plane is positioned in such a way that for any point on the shape perimeter there is another point on the shape perimeter such that a straight line joins the two points and is bisected by the center point.

Thread 110 is a helical ridge wrapped around an associated shaft portion of the fastener 100 about axis 116 and are used to convert between rotational and linear movement and force. The helical ridge may wrap around the shaft portion in a right-handed or left-handed fashion as is known in the art. The cross-sectional shape of 110 may be referred to as the thread form and may have a square, triangular, trapezoidal, or the like, shape. As is exemplary depicted in the Drawings, the thread form may be of a triangular shape. Triangular thread forms shapes may be based on an isosceles or equilateral triangle and may form V-threads or vee-threads because of the triangular shape of the thread form creates V shaped threads. Thread 110 may be a single-start thread, a double-start thread, or the like.

The thread form generally includes a peak 112 and valley 114, also referred to as a major diameter and minor diameter, respectively. Peak 112 is the portion of the thread form furthest from axis 116 and valley 114 is the portion of the thread form nearest axis 116. The major diameter of the thread form is the larger of two diameters delimiting the height of the thread form, as a cross-sectional view of the threads is depicted by a parallel plane containing axis 116. The minor diameter of the thread form is the smaller diameter of the thread. For a screw type fastener 100, the major diameter is the outside diameter (OD) and the minor diameter is the inside diameter (ID) of the threads. The major diameter and minor diameter of external threads 110 are generally smaller than the major diameter and minor diameter of the internal threads of an internally-threaded fastener, if the threads are designed to fit together.

In some embodiments, the fastener 100 threads 110 are tapered at the end distal to the non-threaded shaft 108 and, therefore, the threads therewith are conically helically wrapped about axis 116 to being nonexistent at an end face 116 which has a smaller diameter 116 as compared with the valley 114 diameter. Fastener 100 is generally formed from a metal material, a plastic material, or the like. For example, fastener 100 may be a metal screw type external fastener, a molded plastic screw type fastener, etc.

Figure 2:
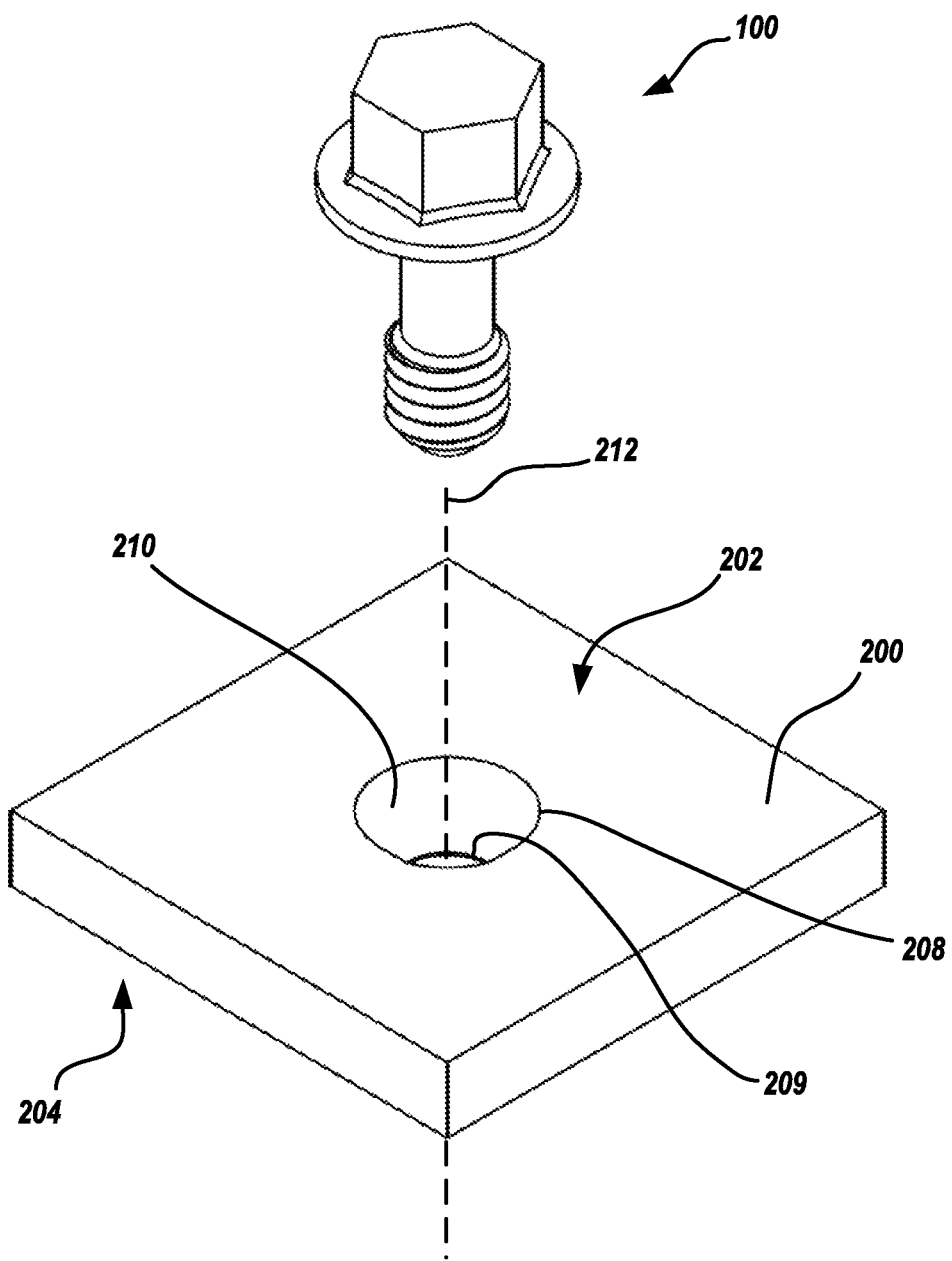
FIG. 2 illustrates an exploded view of an exemplary externally threaded fastener and a component that captivates the externally threaded fastener, according to one or more embodiments of the present invention.

FIG. 2 illustrates an exploded view of externally threaded fastener 100 and a component 200 that captivates the externally threaded fastener 100. Component 200 may include an upper surface 102, lower surface 104, and opening 206. Opening 206 may include a major diameter 208, minor diameter 209, and chamfer surface 210 connecting the major diameter 208 and the minor diameter 209. An axis 212 is the center of symmetry of the major diameter 208 of opening 206. Major diameter 208 is located upon upper surface 202 and is generally larger that the peak 116 diameter of the fastener 100. Surface 202 is generally planar around the area immediately surrounding the opening 206 and is orthogonal to axis 212 therewithin. Minor diameter 209 is located upon lower surface 204 which is generally planar around the area immediately surrounding the opening 206 and is parallel to surface 202 therewithin.

Component 200 may be, for example, an electronic system cover, bezel, or the like. The electronic system may have various sides that which access is generally prohibited and a side or window within a side that which permits access to within the boundary of the sides. The side or window may generally be covered by the cover or bezel. It is beneficial that a fastening system allow for the cover or bezel to cover the side or window of the electronic system generally, but also allow for the cover or bezel to be removed when access to within the electronic system is desired. In a particular implementation, the cover may captivate the externally threaded fastener 100 and the electronic system, or rack in which the electronic system is installed, may include an associated internally threaded fastener that which the threads 110 of fastener 100 are designed to engage with the threads of the internally threaded fastener. It may generally be beneficial for the externally threaded fastener 100 to be captivated upon the cover or bezel to ensure the fastener does not unintentionally separate from the cover or bezel to prevent against the costs associated with a lost fastener.

Component 200 may be formed from a plastic material, metal material, or the like. For example, component 200 may be a sheet metal component, component 200 may be a molded plastic component 200, etc.

Figure 3:
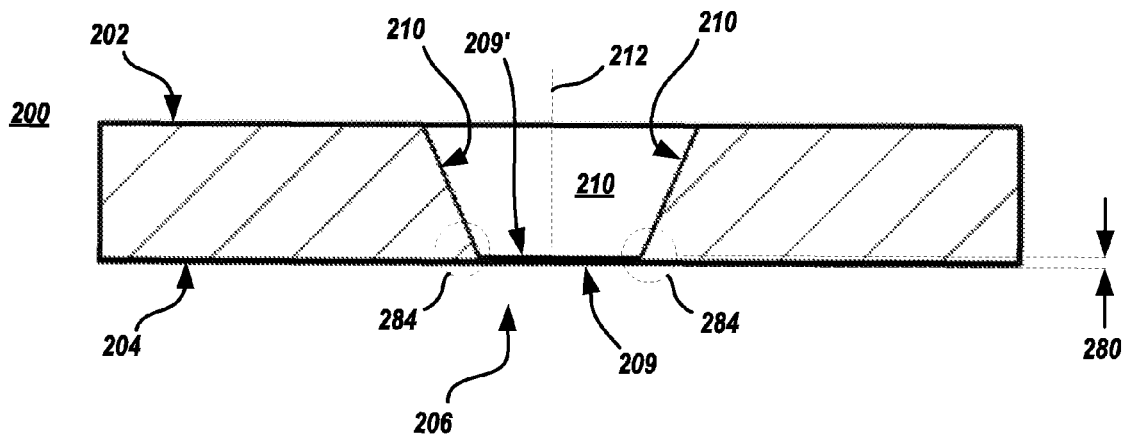
FIG. 3 illustrates a cross sectional detailed view an opening including a major diameter and a minor diameter of the component that captivates the externally threaded fastener, according to one or more embodiments of the present invention.

FIG. 3 illustrates a cross sectional detailed view opening 206 within component 200 which includes major diameter 208 and a minor diameter 209. The features of minor diameter 209 may extend from the lower surface 204 toward surface 202 by a dimension 280. As such, while the minor diameter 209 is located upon lower surface 204 a mirrored minor diameter 209' is located internal to opening 206 toward surface 202 relative to surface 204.

The chamfer surface 210 connects the major diameter 208 and the minor diameter 209 features generally. In other words, chamfer surface 210 connects the major diameter 208 and the minor diameter 209 features when mirrored minor diameter 209' is not utilized and chamfer surface 210 connects the major diameter 208 and the mirrored minor diameter 209' features when mirrored minor diameter 209' is utilized. For clarity, reference to the minor diameter 209 and minor diameter 209' may be used interchangeably.

An acute angle is formed between the chamfer surface 210 and the lower surface 204 such that the vertex portion of the acute angle forms internal thread feature 284. The particular acute angle and the particular dimension 280 (when mirrored minor diameter 209' is included) are such that threads 110 of the fastener 100 fit with or rotateably engage with the internal thread feature 284 when axis 116 of fastener 100 is angled with respect to axis 212 of component 200 and do not fit with or rotateably engage with the internal thread feature 284 when axis 116 of fastener 100 is coincident with respect to axis 212 of component 200.

Figure 4:
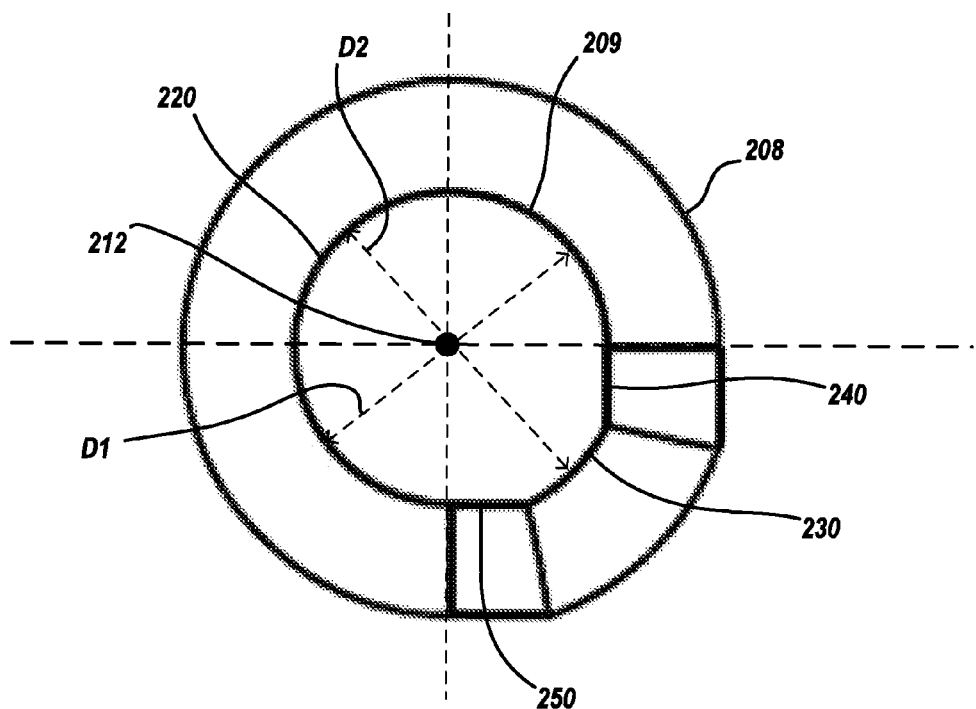
FIG. 4 illustrates a detailed view of the minor diameter of the component opening that captivates the externally threaded fastener, according to one or more embodiments of the present invention.

FIG. 4 illustrates a detailed view of the minor diameter 209 of the component 200 opening 206. Minor diameter 209 includes a first diameter portion 220, a second diameter portion 230, a first line portion 240, and a second line portion 250. Line portion 240 and line portion 250 are generally orthogonal and when referred to collectively may be referred to as orthogonal portions.

First diameter portion 220 has a diameter (D1) equal to the sum of the peak 112 diameter of fastener 100 threads 110 and the valley 114 diameter of fastener 100 threads 110 divided by two. For example, threads 110 of fastener may be M4 type threads wherein a maximum outer diameter is 3.978 mm and a minimum outer diameter is 3.838 mm and wherein a maximum inner diameter is 3.220 mm and a minimum inner diameter is 3.002 mm. As such, the diameter of first diameter portion 220 may be between 3.599 mm (3.978 mm+3.220 mm)/2 and 3.42 mm (3.838 mm+3.002 mm)/2. First diameter portion 220 may extend 270° about axis 212. First diameter portion 220 may be centered upon axis 212.

Second diameter portion 230 has a diameter (D2) larger than that of first diameter portion 220 and generates an adequate clearance such that axis 116 of fastener 100 may be angled with respect to axis 212 of component 200 to allow the threads 100 to fit with or rotatably engage with the internal thread feature 284. Therefore, with reference to the above example, second diameter portion 230 may have a diameter in an equivalent range with a nominal value of 3.9 mm. Second diameter portion 230 may be centered upon axis 212.

Line portion 240 is generally vertical and line portion 250 is generally horizontal are, thus, orthogonal. Line portion 240 connects a first end point of first diameter portion 220 to a first end point of second diameter portion 230. Line portion 250 connects a second end point of first diameter portion 220 to a second end point of second diameter portion 230. For second diameter portion 230 to establish the adequate clearance described above, line portion 250 and line portion 240 may have a length of a quarter of the length of the diameter of the first diameter portion 220.

For clarity, major diameter 208 may be shaped in a complete circle in the plane depicted in FIG. 4. In alternative embodiments, as are shown in FIG. 4, major diameter 208 may have similar features to that of minor diameter 209 (i.e., major diameter may have a first diameter portion, second diameter portion, and orthogonal portions generally dimensionally offset from associated respective features of minor diameter 209).

Figure 5:
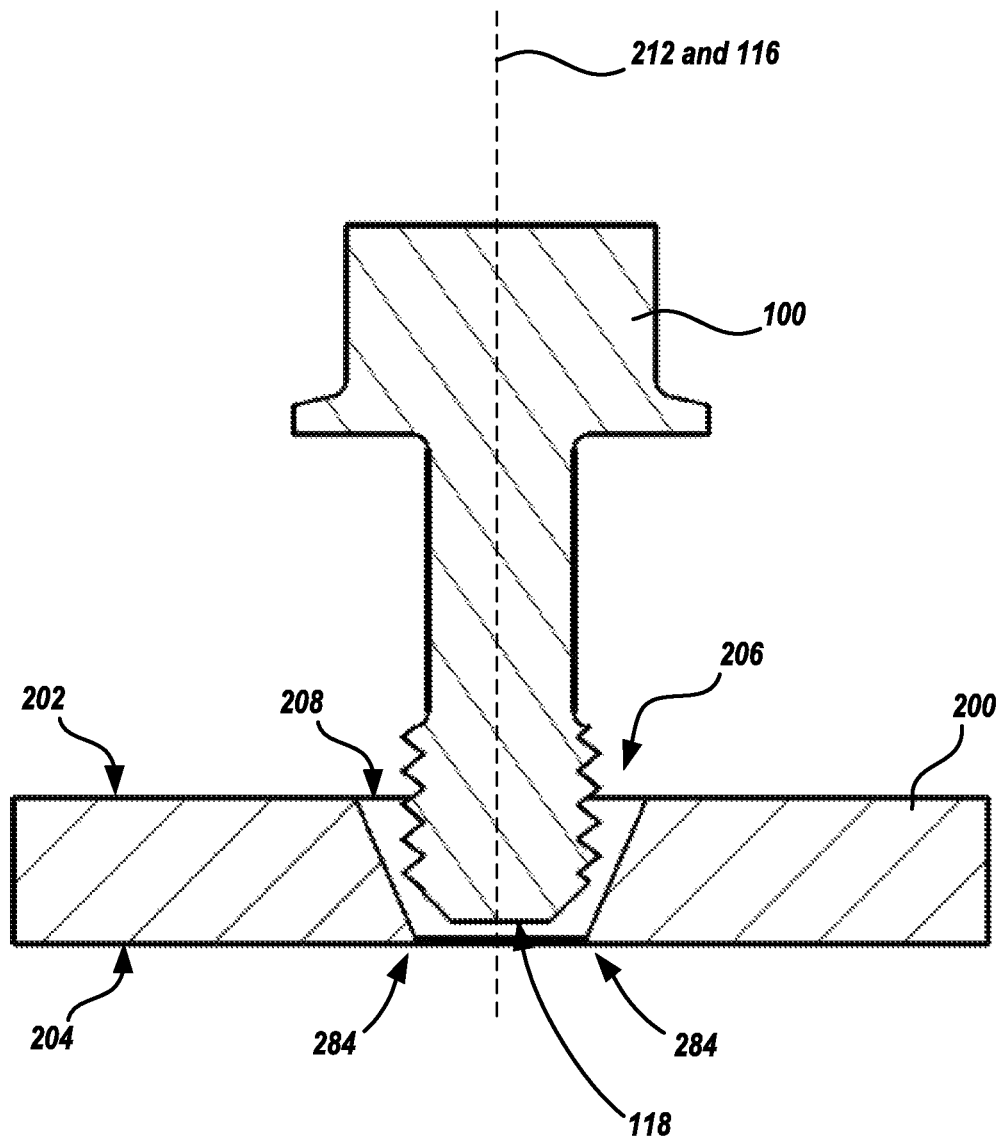
FIG. 5 illustrates an initial stage to captivate an externally threaded fastener with a component including an opening with a major diameter and a minor diameter, according to one or more embodiments of the present invention.

FIG. 5 illustrates an initial stage to captivate externally threaded fastener 100 with a component 200 including an opening 206 with a major diameter 208 and a minor diameter 209, according to one or more embodiments of the present invention. At this initial stage, surface 118 breaches at least surface 202 of component 200. At this initial stage, surface 118 may further breach at least surface 204 of component 200. When axis 116 of fastener 100 is coincident, or aligned, with axis 212 of component 200 as is shown in FIG. 5, threads 110 of fastener do not fit with or do not rotatably engage with internal thread feature 284.

Figure 6:
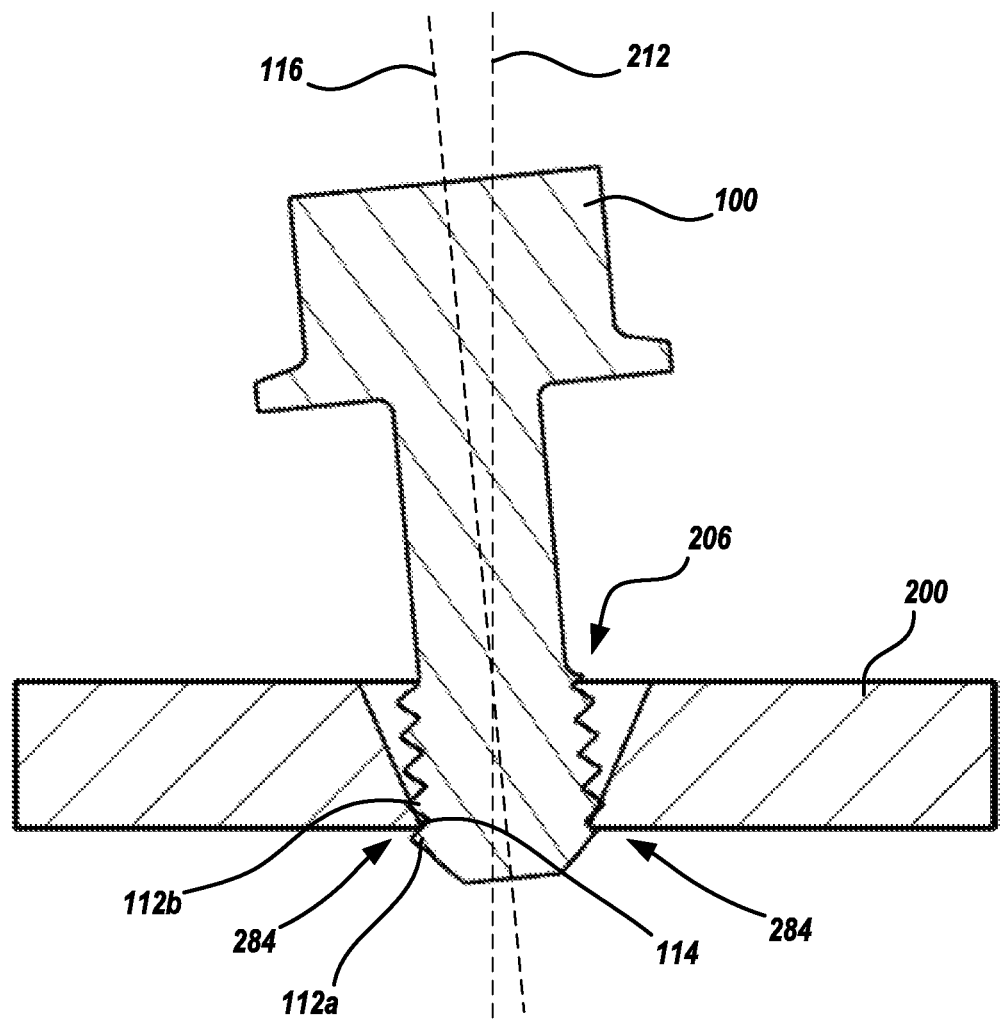
FIG. 6 illustrates a subsequent stage to captivate the externally threaded fastener with the component, according to one or more embodiments of the present invention.

FIG. 6 illustrates a subsequent stage to captivate the externally threaded fastener 100 with the component 200 including an opening 206 with a major diameter 208 and a minor diameter 209, according to one or more embodiments of the present invention. In order for the threads 110 to fit with or rotatably engage with internal thread feature 284, fastener 100 is angled with respect to axis 212 of component 200 into the clearance formed by minor diameter 209 features. The clearance allows axis 116 of fastener 100 to be angled with respect to axis 212 of component 200 to allow the valley 114 to fit within the minor diameter 209 opening and for the threads 110 to fit with or rotatably engage with the internal thread feature 284. For example, by angling fastener 100 with respect to axis 212 of component 212, internal thread feature 284 fits within valley 114 formed between first peak 112a and subsequent peak 112b and threads 110 generally rotateably engage with internal thread feature 284. As such, the relative dimensions, geometries, or the like of the features of minor diameter 209 form the clearance which allows the fastener 100 to be angled with respect to axis 212 of component 200 into the clearance in order for the threads 110 to fit with or rotatably engage with internal thread feature 284.

The fastener 100 may further be rotatably engaged with the internal thread feature 284 for the entire length of the threads 100 wherein which the angle formed by axis 116 and angle 212 is generally maintained within an appropriate angle tolerance when associated with the tolerances of forming opening 206 within component 200 and the tolerances associated with the features of fastener 100.

Figure 7:
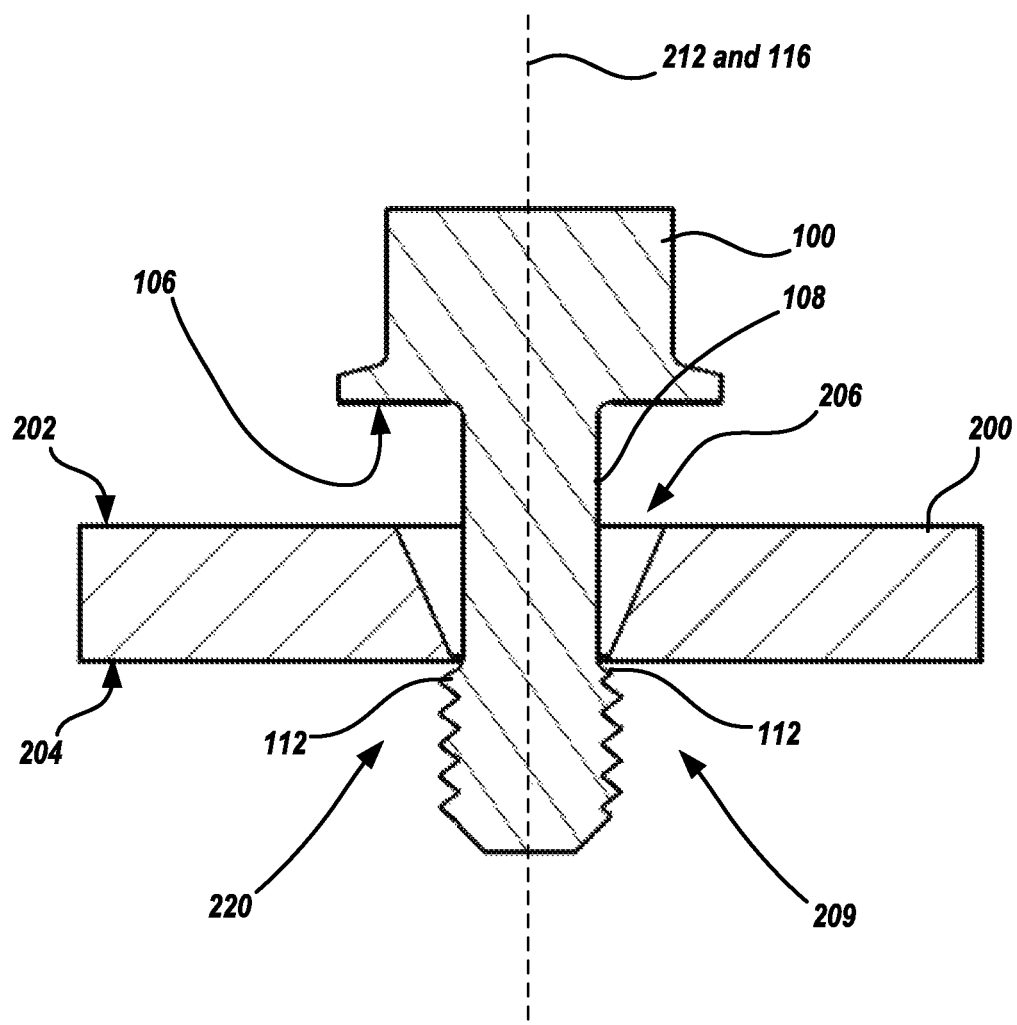
FIG. 7 illustrates a subsequent stage to captivate the externally threaded fastener with the component, according to one or more embodiments of the present invention.

FIG. 7 illustrates a subsequent stage to captivate the externally threaded fastener 100 with the component 200, according to one or more embodiments of the present invention. Upon the fastener 100 being rotatably engaged with the internal thread feature 284 for the entire length of the threads 100 the first diameter 220 of minor diameter 209 generally clamps, engages, or otherwise limits the fastener 220 from movement in at least two planes. When first diameter 220 of minor diameter 209 limits fastener 220 movement in at least two planes, axis 116 is generally aligned with axis 212.

Figure 8:
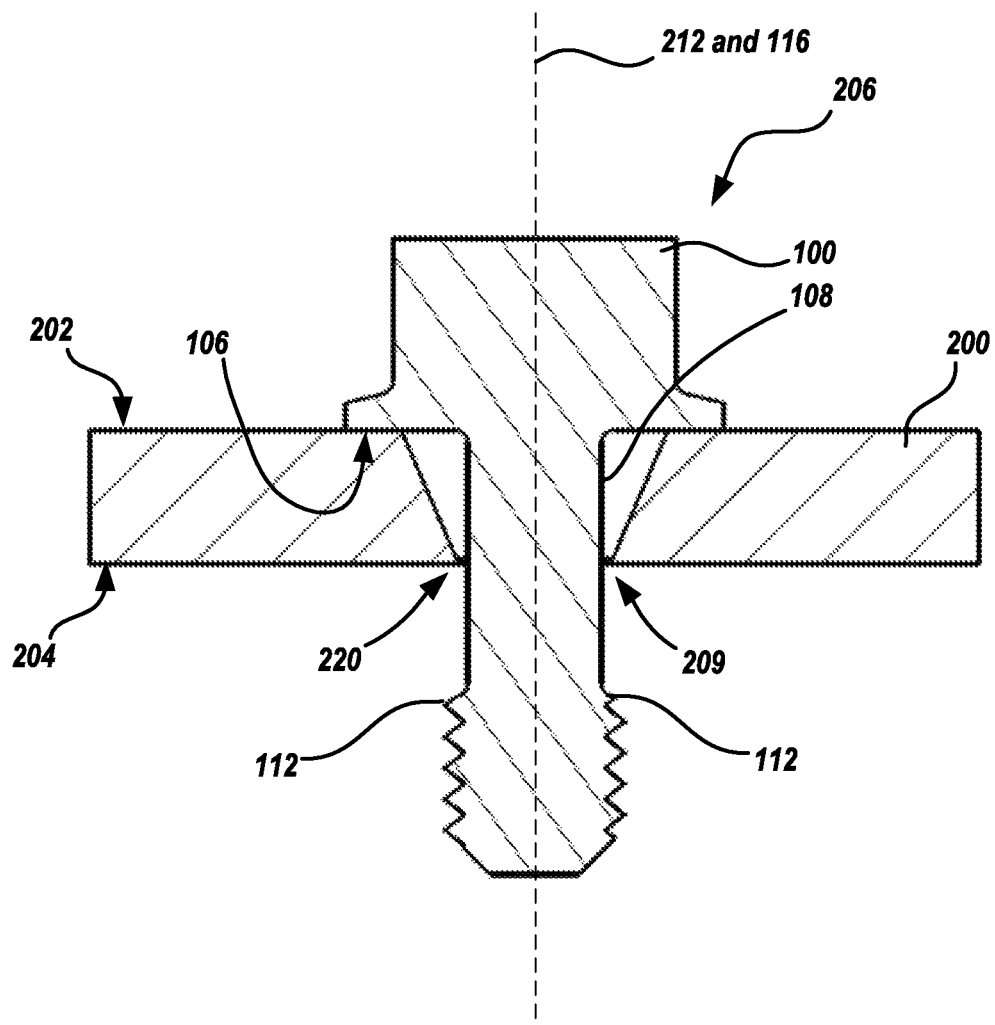
FIG. 8 illustrates a subsequent stage to captivate the externally threaded fastener with the component, according to one or more embodiments of the present invention.

First diameter 220 of minor diameter 209 limits fastener 220 movement by the fastener 100 non-threaded shaft 300 being slightly smaller in diameter than the diameter of first diameter 220 of minor diameter 209 allows the fastener to move in the vertical axis when viewing FIG. 7 and limits movement in the horizontal axis and into and out of the page when viewing FIG. 7. Though the fastener 100 may move in the positive and negative vertical direction, such vertical movement is limited by the peak 112 of threads 100 contacting lower surface 204 of component 200 and may be further limited by flange 104 surface 106 contacting component 200 upper surface 202, as is shown in FIG. 8. In this manner, subsequent to fastener 100 being rotatably engaged with the internal thread feature 284 for the entire length of the threads 100, fastener 100 becomes captivated to component 200. As such, unintentional separation of the fastener 100 from the component 200 is limited. To intentionally separate fastener 100 from component 200, the fastener 100 is positioned within the opening 206 clearance by angling the fastener 100 relative to axis 212 of component 200 and rotating the fastener in the opposite direction relative to the direction of initial captivation of fastener 100 from component 200, in a similar manner that which is shown in FIG. 6.

Figure 9:
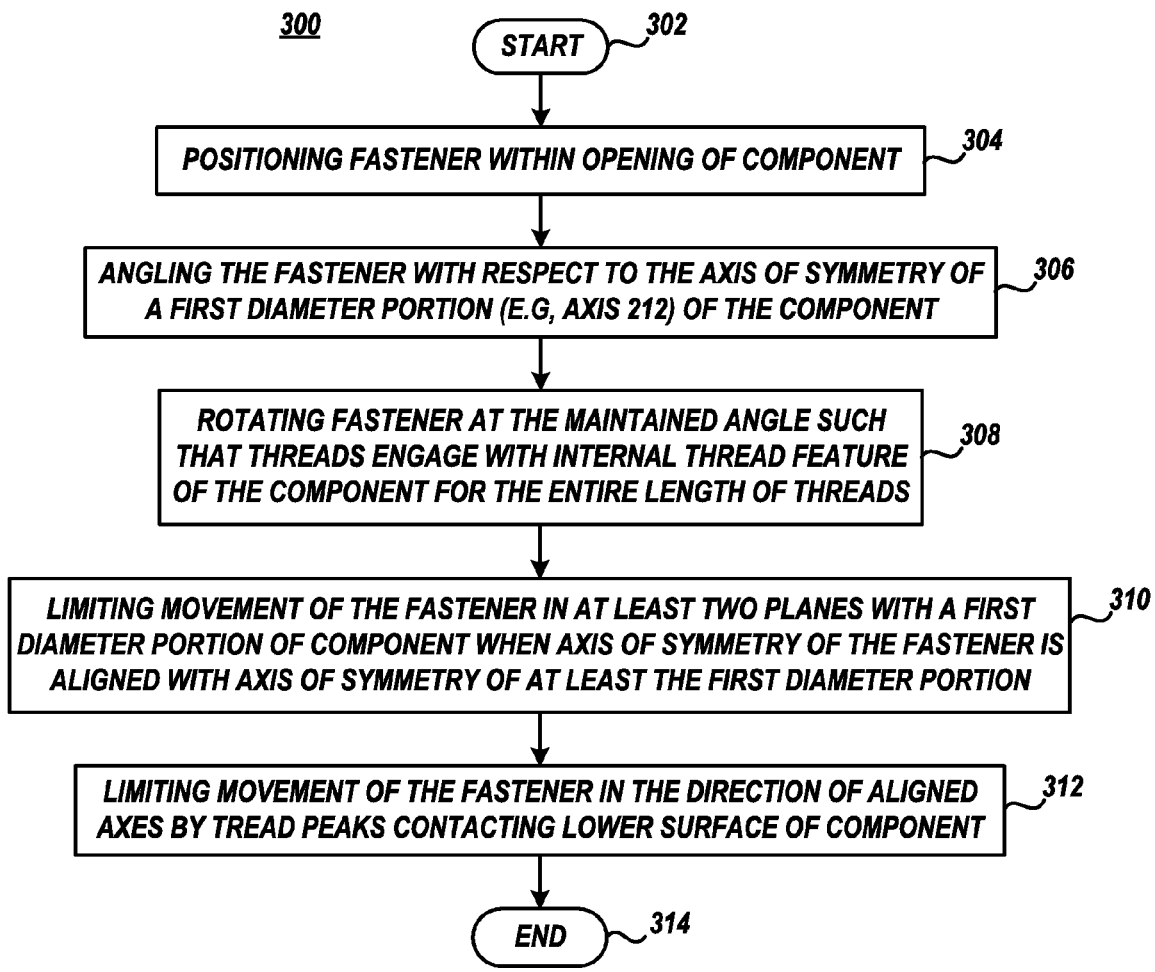
FIG. 9 illustrates a method of captivating an externally threaded fastener with a component including an opening with a major diameter and a minor diameter.

FIG. 9 illustrates a method 300 of captivating externally threaded fastener 100 with component 200 including an opening 206 with a major diameter 208 and a minor diameter 209. The major diameter 208 is generally circular and the minor diameter 209 includes a first diameter portion 220, a second diameter portion 230, and orthogonal portions. The first diameter portion 220 and the second diameter portion 230 are generally circular arcs and the orthogonal portions are straight orthogonal lines connecting respective endpoints of the first diameter portion 220 and the second diameter portion 230. Fastener 100 includes threads 110, non-threaded shaft 108, and may further include flange 104.

Method 300 begins at block 302 and continues with positioning the fastener 100 within opening 206 (block 304). For example, a distal portion of the fastener away from the non-threaded shaft 108 may breach opening 206. Method 300 may continue with angling the fastener 100 with respect to the axis of symmetry (i.e., axis 212) of the first diameter portion 220 (block 306). For example, an axis of symmetry of fastener is angled from axis 212 of component 200.

The first diameter portion 220, second diameter portion 230, and orthogonal portions generally form a clearance such that the fastener 100 may be angled with respect to the axis of symmetry of the first diameter portion 220 and also allow for the threads 110 of fastener 100 to fit with or engage with internal thread feature 284. Internal thread feature 284 is a vertex or edge feature defined by bottom surface 204 of component 200 and chamfer surface 110 which connects the major diameter 208 and the minor diameter 209 of opening 206.

Method 300 may continue with rotating fastener 100 at the maintained angle such that the threads 110 engage with internal thread feature 284 for the entire length of threads 110 (block 308). For example, fastener 100 is rotated about axis 116 while the angle between axis 116 and axis 212 is maintained during the rotation.

Method 300 may continue with the first diameter portion 220 limiting movement of the fastener 100 in at least two planes when the axis of symmetry of the fastener 100 is aligned with the axis of symmetry of the first diameter portion 220 (block 310). First diameter 220 of minor diameter 209 limits fastener 220 movement of the fastener 100 by the non-threaded shaft 300 being slightly smaller in diameter than the diameter of first diameter 220 of minor diameter 209. For example, the minor diameter 209 allows the fastener to move in the direction of aligned axes 116, 212 and limits movement in the panes orthogonal therefrom.

Method 300 may continue with limiting movement of the fastener 100 in the direction of aligned axes 116 and 212 (block 312). Such direction movement of fastener 100 is limited by the peak 112 of threads 100 contacting lower surface 204 of component 200 and may be further limited by flange 104 surface 106 contacting component 200 upper surface 202. In this manner, subsequent to fastener 100 being rotatably engaged with the internal thread feature 284 for the entire length of the threads 100, fastener 100 becomes aligned with axis 212 and is captivated to component 200. Method 300 ends at block 314.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. An method of capturing an externally threaded fastener to a component, the method comprising:
   angling the externally threaded fastener within an opening of the component relative to an axis of symmetry of the opening, wherein the opening of the component comprises a major diameter at the top surface of the component, a minor diameter at the bottom surface of the component, and a chamfer surface connecting the major diameter and the minor diameter, and wherein the chamfer surface is acutely angled to the bottom surface of the component, wherein the minor diameter comprises a first diameter portion, a second diameter portion, a first line portion that connects a first end point of the first diameter portion and a first endpoint of the second diameter portion, and a second line portion that connects a second end point of the first diameter portion and a second endpoint of the second diameter portion;
   rotating the externally threaded fastener at the angle to engage a thread of the externally threaded fastener with the opening for an entire length of the thread;
   subsequent to engaging the thread of the externally threaded fastener with the opening for the entire length of the thread, aligning the externally threaded fastener with the axis of symmetry of the opening; and
   limiting movement of the externally threaded fastener in two orthogonal directions by the opening contacting a non-threaded shaft of the externally threaded fastener.

2. The method of claim 1, further comprising:
   limiting movement of the externally threaded fastener in a third orthogonal direction by the thread contacting a bottom surface of the component.

3. The method of claim 2, further comprising:
   limiting movement of the externally threaded fastener in the third orthogonal direction by a flange of the externally threaded fastener contacting a top surface of the component.

4. The method of claim 1, wherein the second diameter portion comprises a diameter larger than the first diameter portion.

5. The method of claim 1, wherein the first diameter portion is a two hundred seventy degree circular arc and wherein the first line portion is orthogonal to the second line portion.

6. The method of claim 1, wherein the first line portion length and the second line portion length are a quarter of the first diameter portion diameter, and wherein the first diameter portion, the second diameter portion, the first line portion, and the second line portion allow a clearance to be formed within the opening so that the externally threaded fastener may be angled relative to the axis of symmetry of the opening.

7. The method of claim 1, wherein the axis of symmetry of the opening is the first diameter portion and the second diameter portion center.

8. An method of capturing an externally threaded fastener to an electronic system enclosure cover, the method comprising:
   angling the externally threaded fastener within an opening of the cover relative to an axis of symmetry of the opening, wherein the opening of the cover comprises a major diameter at the top surface of the cover, a minor diameter at the bottom surface of the cover, and a chamfer surface connecting the major diameter and the minor diameter, wherein the chamfer surface is acutely angled to the bottom surface of the cover, wherein the minor diameter comprises a first diameter portion, a second diameter portion, a first line portion that connects a first end point of the first diameter portion and a first endpoint of the second diameter portion, and a second line portion that connects a second end point of the first diameter portion and a second endpoint of the second diameter portion;

rotating the externally threaded fastener at the angle to engage a thread of the externally threaded fastener with the opening for an entire length of the thread;

subsequent to engaging the thread of the externally threaded fastener with the opening for the entire length of the thread, aligning the externally threaded fastener with the axis of symmetry of the opening; and limiting movement of the externally threaded fastener in two orthogonal directions by the opening contacting a non-threaded shaft of the externally threaded fastener.

9. The method of claim 8, further comprising:
limiting movement of the externally threaded fastener in a third orthogonal direction by the thread contacting a bottom surface of the cover.

10. The method of claim 9, further comprising:
limiting movement of the externally threaded fastener in the third orthogonal direction by a flange of the externally threaded fastener contacting a top surface of the cover.

11. The method of claim 8, wherein the second diameter portion comprises a diameter larger than the first diameter portion.

12. The method of claim 8, wherein the first diameter portion is a two hundred seventy degree circular arc and wherein the first line portion is orthogonal to the second line portion.

13. The method of claim 8, wherein the first line portion length and the second line portion length are a quarter of the first diameter portion diameter, and wherein the first diameter portion, the second diameter portion, the first line portion, and the second line portion allow a clearance to be formed within the opening so that the externally threaded fastener may be angled relative to the axis of symmetry of the opening.

14. The method of claim 8, wherein the axis of symmetry of the opening is the first diameter portion and the second diameter portion center.

* * * * *